United States Patent
Suzuki

(10) Patent No.: US 9,746,966 B2
(45) Date of Patent: Aug. 29, 2017

(54) TOUCH DETECTION APPARATUS, TOUCH DETECTION METHOD, AND NON-TRANSITORY COMPUTER-READABLE RECORDING MEDIUM

(71) Applicant: FUJITSU LIMITED, Kawasaki-shi, Kanagawa (JP)

(72) Inventor: Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 15/049,729

(22) Filed: Feb. 22, 2016

(65) Prior Publication Data

US 2016/0283040 A1    Sep. 29, 2016

(30) Foreign Application Priority Data

Mar. 26, 2015    (JP) .................................. 2015-065337

(51) Int. Cl.
*G06F 3/042*    (2006.01)

(52) U.S. Cl.
CPC ............ *G06F 3/0425* (2013.01); *G06F 3/042* (2013.01); *G06F 2203/04101* (2013.01)

(58) Field of Classification Search
CPC combination set(s) only.
See application file for complete search history.

(56) References Cited

U.S. PATENT DOCUMENTS

| | | | |
|---|---|---|---|
| 2013/0328766 A1 | 12/2013 | Igarashi et al. | |
| 2014/0176498 A1* | 6/2014 | Yanase | G06F 3/044 345/174 |
| 2014/0292647 A1 | 10/2014 | Murase et al. | |
| 2014/0292648 A1 | 10/2014 | Matsuda et al. | |

FOREIGN PATENT DOCUMENTS

| | | |
|---|---|---|
| JP | 60-152903 | 8/1985 |
| JP | 2003-346162 | 12/2003 |
| JP | 2013-172211 | 9/2013 |
| JP | 2013-257686 | 12/2013 |
| JP | 2014-203174 | 10/2014 |
| JP | 2014-204196 | 10/2014 |

* cited by examiner

*Primary Examiner* — Van Chow
(74) *Attorney, Agent, or Firm* — Staas & Halsey LLP

(57) ABSTRACT

A touch detection apparatus including a first camera configured to capture a plurality of first images, a second camera configured to capture a plurality of second images, a memory, and a processor configured to detect a plurality of first positions corresponding to a tip of the finger in the plurality of first images, obtain a plurality of second positions in the plurality of second images corresponding to the plurality of first positions, calculate a plurality of third positions based on the plurality of first positions and the plurality of second positions, the plurality of third positions being positions in real space of the tip of the finger, determine whether or not a calculated feature value calculated based on the plurality of third positions satisfies a condition, and determine that an action of touching an object has been performed when the calculated feature value satisfies the condition.

9 Claims, 12 Drawing Sheets

| HEIGHTMAP | | |
|---|---|---|
| X | Y | Z |
| 0 | 0 | 0 |
| 0 | 1 | 0 |
| ... | ... | ... |
| 249 | 159 | 23 |
| ... | ... | ... |
| 500 | 375 | 0 |

300

FIG. 7A
FIG. 7B
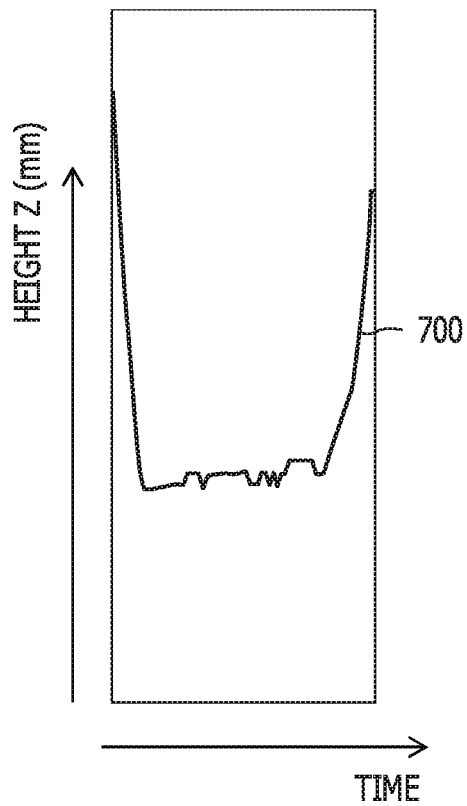
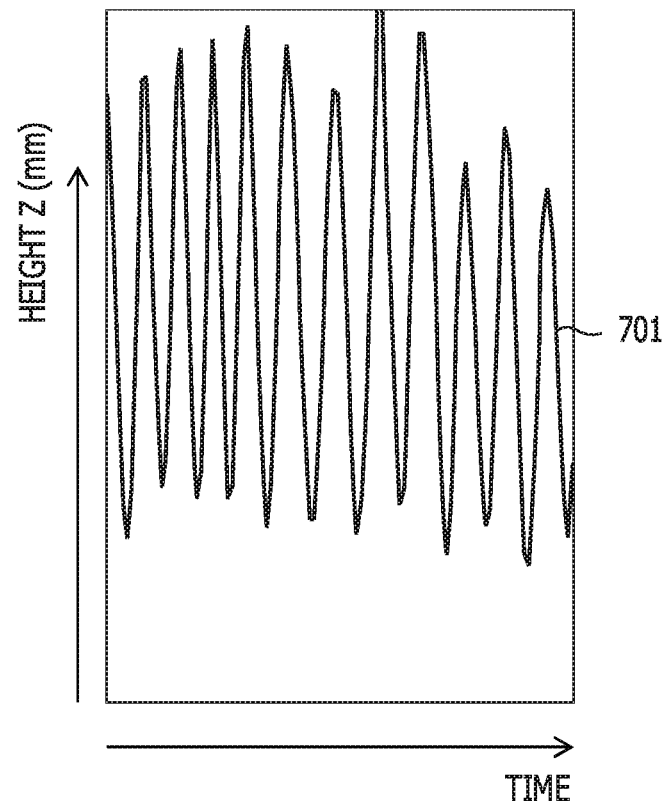

FIG. 10A
FIG. 10B
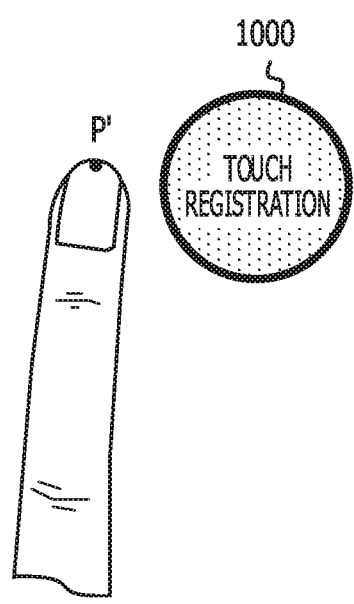
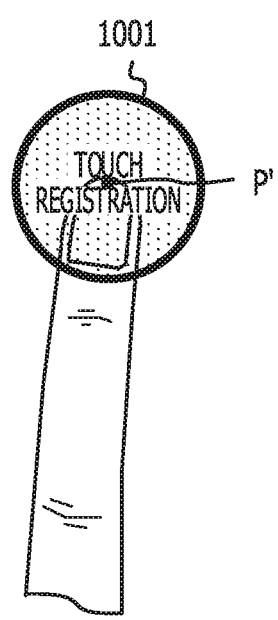

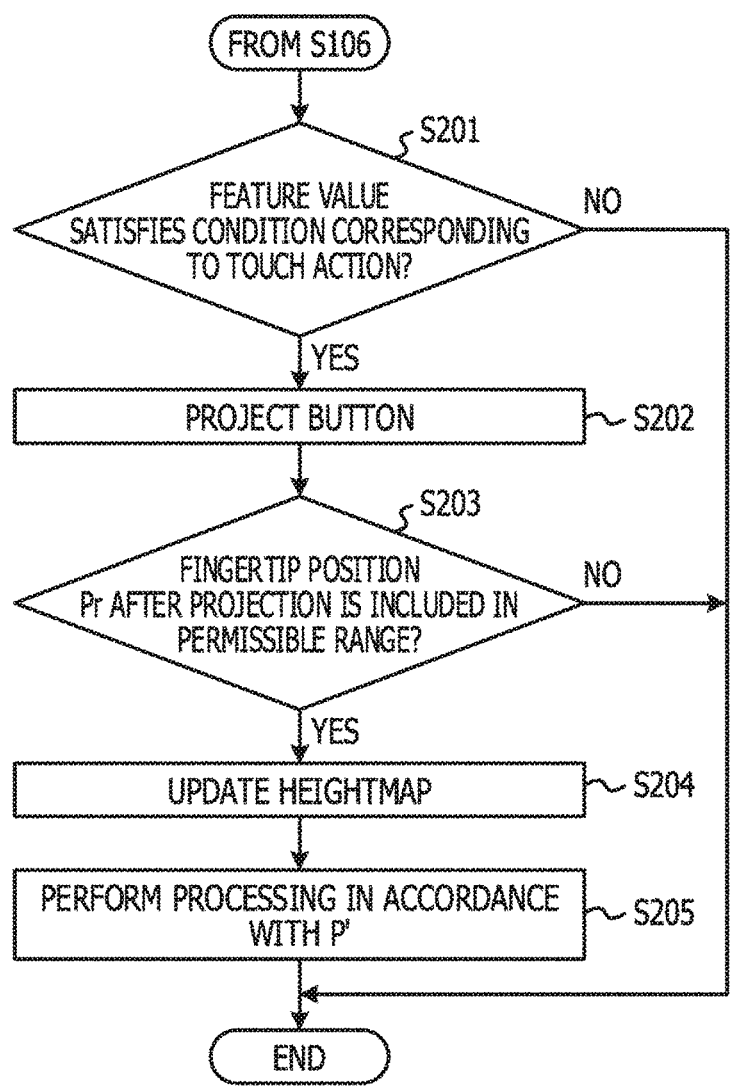

TOUCH DETECTION APPARATUS, TOUCH DETECTION METHOD, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2015-065337, filed on Mar. 26, 2015, the entire contents of which are incorporated herein by reference.

FIELD

The embodiments discussed herein are related to, for example, an input device, an input operation detection method, and a non-transitory computer-readable recording medium storing an input operation detection program.

BACKGROUND

User interfaces for sensing human actions and, in accordance with the actions, generating input signals have recently been studied. As an example of such a user interface, a remote control device has been proposed (for example, refer to Japanese Laid-open Patent Publication No. 2013-172211). In this remote control device, a particular object set in advance is used as an input device, and a device to be controlled is manipulated in such a way that the manipulation is dependent on the operation of the operator performed on the input device.

The remote control device disclosed in Japanese Laid-open Patent Publication No. 2013-172211 detects a manipulation operation performed on an input device and, based on the content of the detected manipulation operation and a preset correspondence relationship between the content of the manipulation operation and the content for manipulating the device to be controlled, determines the content for manipulation to the device to be controlled. The remote control device performs, for example, stereo matching of images captured using two cameras arranged in parallel so as to calculate how far the corresponding points between the cameras are from each other on the captured images. From the calculation result, the remote control device determines the distance to a hand of the operator. The remote control device compares this distance with the distance to the input device to determine whether or not the hand of the operator has touched the input device. Using the result of the determination, the remote control device detects a manipulation operation.

As described above, to determine whether or not the operator has touched an object by comparing the distance from the camera to the hand of the operator with the distance from the camera to the object, it is desired that the distance from the camera to the object be measured in advance. Therefore, in the remote control device described above, the distance from the camera to the object is determined by stereo matching. Additionally, there is known a method in which an object to be measured is irradiated with respective ones of a plurality of coded light patterns, and images obtained by capturing images of the irradiated object to be measured at different positions are analyzed, so that the position of the object to be measured is determined (for example, refer to Japanese Laid-open Patent Publication No. 60-152903).

SUMMARY

According to an aspect of the invention, a touch detection apparatus including a first camera configured to capture each of a plurality of first images in each given period, a second camera arranged apart from the first camera by a given interval and configured to capture each of a plurality of second images in each given period, a memory, and a processor coupled to the memory, and configured to detect a plurality of first positions corresponding to a tip of the finger in the plurality of first images, obtain a plurality of second positions in the plurality of second images corresponding to the detected plurality of first positions, calculate a plurality of third positions based on the detected plurality of first positions and the detected plurality of second positions, the plurality of third positions being positions in real space of the tip of the finger, determine whether or not a calculated feature value calculated based on the plurality of third positions satisfies a condition, the condition being a feature value that represents an action of touching an object with the finger, and determine that an action of touching the object has been performed when the calculated feature value satisfies the condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A and FIG. 7B are diagrams each depicting an example of a measurement result of the variation with time of the height of a finger from the table when the user is performing an action of causing the fingertip to be stationary in the air;

FIG. 10A and FIG. 10B are diagrams each illustrating an example of a button for operation verification;

FIG. 12 is an operation flowchart of an input process according to the second embodiment.

DESCRIPTION OF EMBODIMENTS

In the method disclosed in Japanese Laid-open Patent Publication No. 60-152903, an object is scanned with coded light for the purpose of measuring a distance to the object. Therefore, when the user does not instruct the input device to perform such scanning, the distance to the object is not determined, and thus it is not possible in some cases to determine whether or not a hand of the user has touched the object. Additionally, it takes some amount of time for such scanning to be completed. For this reason, for example, when the distance from a camera to the object frequently changes, such as when the object is a book and the user performs some operation while turning pages of the book, it is troublesome for the user to provide an instruction for the scanning. Additionally, when the surface of the object is made of a material that readily reflects light or is made of a substance with a high light-absorption rate, it is difficult to read coded light projected on the object. Thus, there is a possibility that the distance to the target is not able to be accurately measured.

In contrast, in cases where stereo matching is used, if the surface of an object has no features that are readily detected on an image obtained by capturing an image of the object, for example, if the surface of the object has no pattern, it is difficult to accurately measure the distance from a camera to the object. In particular, if an object and a table on which the object is mounted are the same color and both have no pattern, it is very difficult to identify the object on the image. Therefore, it is difficult to accurately measure the distance from the camera to the object.

In one aspect, an object of the present disclosure is to provide an input device capable of detecting an input operation if, when the user performs an input operation, the distance to an object that the user touches is not clear.

Hereinafter, with reference to the accompanying drawings, an input device will be described. At that point, if, from the results of a comparison of distances, the input device is not able to detect that the fingertip has touched the object, the input device obtains a feature value representing a motion of the finger within the last certain period of time so as to determine whether or not the motion of the finger is a touch action in which the user is going to touch the object. If it is determined that the motion of the finger of the user is the touch action, the input device assumes that the finger of the user has touched the object, and executes a process that is suitable for an input operation in accordance with the position of the finger.

Figure 1:
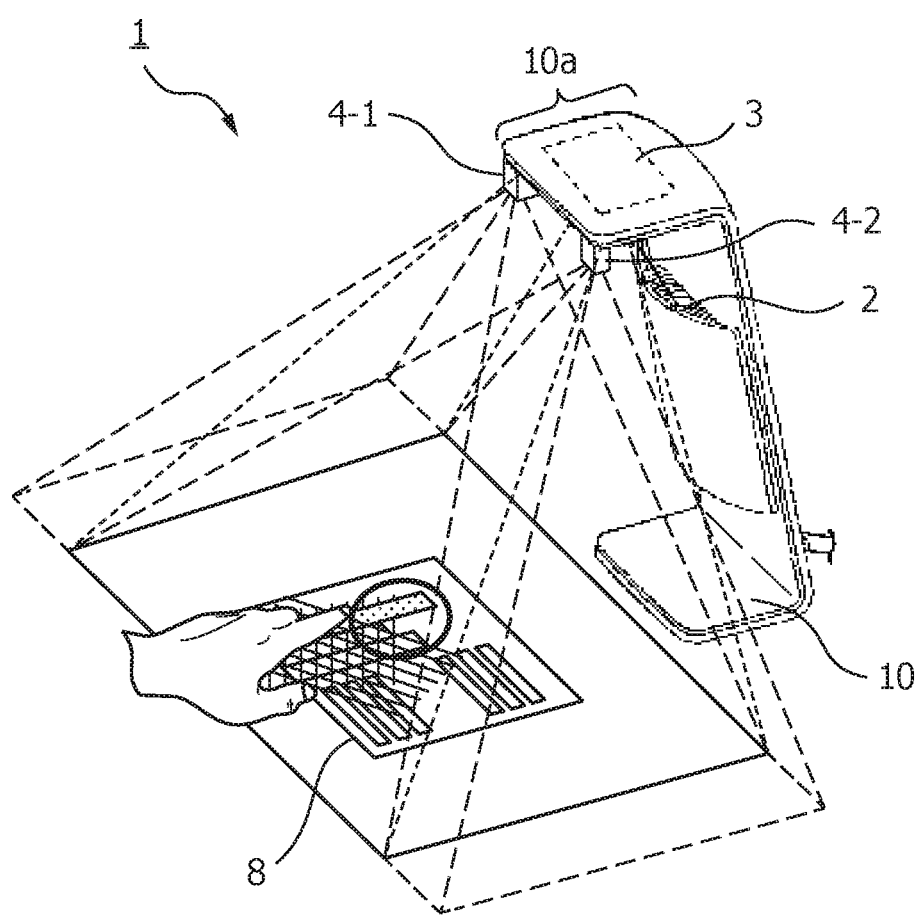
FIG. 1 is a schematic perspective view illustrating a configuration example of an input device according to a first embodiment.
Figure 2:
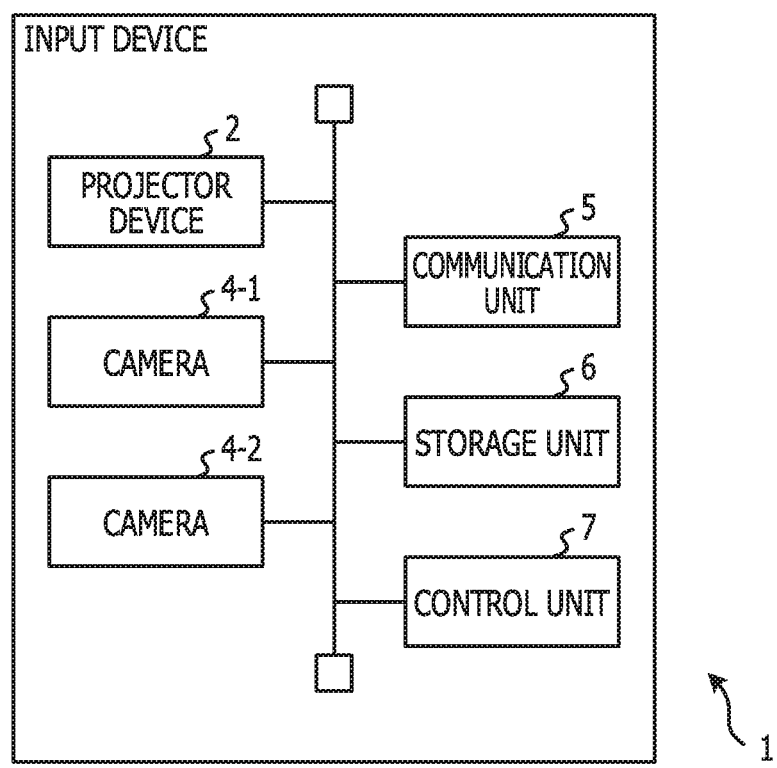
FIG. 2 is a hardware configuration diagram of the input device illustrated in FIG. 1.

FIG. 1 is a schematic perspective view of an input device according to a first embodiment. FIG. 2 is a hardware configuration diagram of the input device illustrated in FIG. 1. The input device 1 includes a projector device 2, a mirror 3, two cameras 4-1 and 4-2, a communication unit 5, a storage unit 6, and a control unit 7. These units included in the input device 1 are contained in a housing 10 in a vertical u-shape as viewed from the side. Note that, hereinafter, the side facing the user is referred to as the front for the sake of descriptive convenience.

The projector device 2, which is, for example, a liquid crystal projector, is arranged with its display surface turned upward on the front side of the housing 10. The projector device 2 displays a video on its display surface in accordance with video signals received from the control unit 7, projecting the video. The video projected from the projector device 2 is reflected by a mirror 3, which is provided on the underside of an apex portion 10a of the housing 10 protruding toward the front, to be projected onto, for example, a table surface or the like, which serves as a reference surface on which is mounted an object 8 for which it is determined whether or not a fingertip of the user has touched the object. Note that the object 8 may be, but is not limited to, for example, a book, a magazine, paper, or the like. The object 8 may be a table itself on which the input device 1 is mounted.

The two cameras 4-1 and 4-2, which are examples of imaging units, respectively, are arranged on the apex portion 10a to be apart from each other by a given interval so as to sandwich the mirror 3 and to be turned downward. Note that the heights from the table surface to the cameras 4-1 and 4-2 are each set to, for example, 600 mm so that the object 8 is included in the image capture ranges of both the camera 4-1 and the camera 4-2 and that a fingertip positioned near the object 8 is identifiable on images. Each of the cameras 4-1 and 4-2 produces an image captured in its image capture range during a given image capture period (for example, 10 msec to 50 msec). In the present embodiment, images produced by the cameras 4-1 and 4-2 are color images in the RGB color system. In the present embodiment, the parallax direction between the camera 4-1 and the camera 4-2 is the horizontal direction in an image produced by each camera. Whenever producing an image, each of the cameras 4-1 and 4-2 outputs the image to the control unit 7.

The communication unit 5 includes an interface for coupling the input device 1 with other devices, and a control circuit for the interface. The communication unit 5, for example, passes video signals received from another device to the control unit 7. Alternatively, the communication unit 5 outputs input signals in accordance with an input of the user, which are received from the control unit 7, to another device.

The storage unit 6 includes, for example, a volatile or nonvolatile semiconductor memory circuit. The storage unit 6 stores various types of information used for detecting video signals representing videos projected by the projector device 2 and a control input of the user. Examples of the information used for detecting a control input of the user include the interval between the camera 4-1 and the camera 4-2, the focal lengths of the cameras 4-1 and 4-2, various parameters used for detection of the position of a fingertip and for detection of a motion of the finger, and so on. Additionally, the information used for detection of a control input of the user may include a height map representing the height from the table to the surface of the object 8 at each position of a plane parallel to the table. Additionally, the storage unit 6 may store an image obtained from the camera 4-1 or the camera 4-2.

Figure 3:
FIG. 3 is a diagram depicting an example of a height map.

FIG. 3 is a diagram depicting an example of a height map. A height map 300 stores a height Z from the table to the object 8 for each pair of a coordinate X in the horizontal direction and a coordinate Y in the vertical direction in the global coordinate system on a plane parallel to the surface of the table. For example, the height map 300 represents that the height at a position of coordinates (0, 0) is 0 mm and the height at a position of coordinates (249, 159) is 23 mm.

The control unit 7 includes one or a plurality of processors and their peripheral circuit. The control unit 7 is coupled to the projector device 2, the cameras 4-1 and 4-2, the communication unit 5, and the storage unit 6 via signal lines and controls the entirety of the input device 1.

The control unit 7 determines the position of a fingertip on an image received from each of the camera 4-1 and the camera 4-2 and thus identifies the position of a fingertip of the user in real space (that is, the three-dimensional position). Based on the position of the fingertip in real space, the control unit 7 then determines whether or not an input operation of the user has been performed, and, if it is determined that the input operation has been performed, executes a process in accordance with the position of the fingertip.

Hereinafter, elements related to an input process executed by the control unit 7 will be described in detail.

Figure 4:
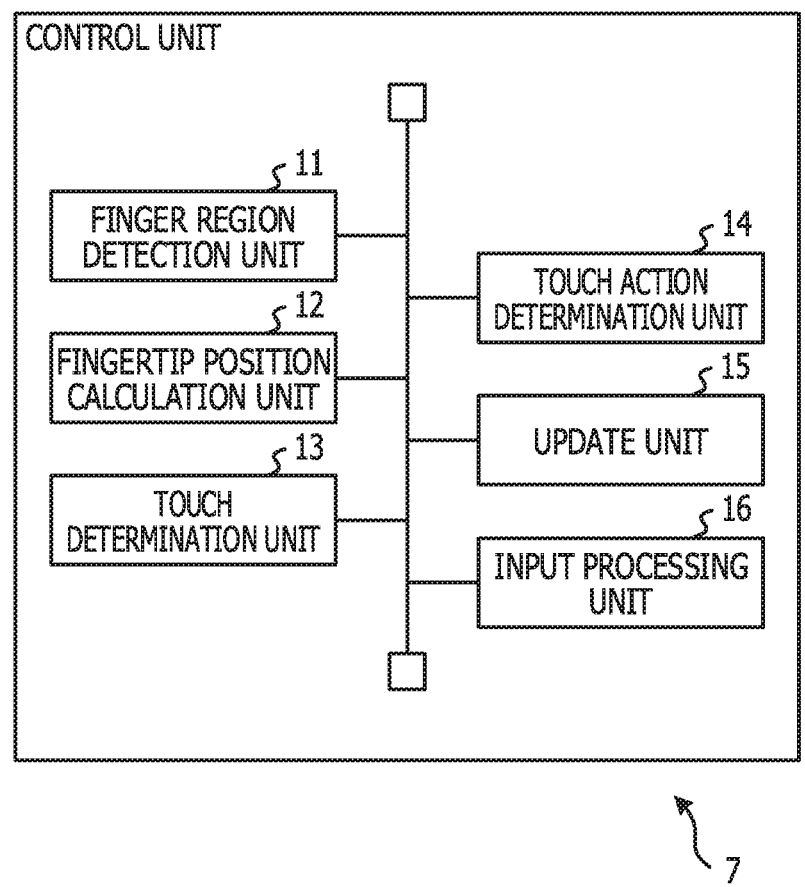
FIG. 4 is a functional block diagram of a control unit according to the first embodiment.

FIG. 4 is a functional block diagram of the control unit 7. The control unit 7 includes a finger region detection unit 11, a fingertip position calculation unit 12, a touch determination unit 13, a touch action determination unit 14, an update unit 15, and an input processing unit 16.

These units included in the control unit 7 may be, for example, mounted as functional modules implemented by a computer program executed on the processor or processors included in the control unit 7. Note that these units may be mounted respectively as different circuits, separately from the control unit 7, on the input device 1, or may be mounted as a single integrated circuit that implements the function of these units, separately from the control unit 7, on the input device 1.

Each time the control unit 7 acquires an image from each of the camera 4-1 and the camera 4-2, the finger region detection unit 11 detects a finger region, which is a region where a finger is captured, on an image acquired form either one camera. Hereinafter, it is assumed that the finger region detection unit 11 detects a finger region on an image obtained from the camera 4-1.

In the present embodiment, the finger region detection unit 11 extracts, as a finger region, a region having a color corresponding to a flesh color on an image. For this purpose, the finger region detection unit 11 converts the value of each pixel of the image according to the following expressions, from the value in the RGB color system to the value in the HSV color system.

$$V = \mathrm{MAX}(R, G, B) \qquad (1)$$
$$S = 255 \times \frac{\mathrm{MAX}(R, G, B) - \mathrm{MIN}(R, G, B)}{\mathrm{MAX}(R, G, B)}$$
$$H = 60 \times \left( \frac{B - G}{\mathrm{MAX}(R, G, B) - \mathrm{MIN}(R, G, B)} \right)$$
$$(\text{if } R = \mathrm{MAX}(R, G, B))$$
$$H = 60 \times \left( 2 + \frac{R - B}{\mathrm{MAX}(R, G, B) - \mathrm{MIN}(R, G, B)} \right)$$
$$(\text{if } G = \mathrm{MAX}(R, G, B))$$
$$H = 60 \times \left( 4 + \frac{G - R}{\mathrm{MAX}(R, G, B) - \mathrm{MIN}(R, G, B)} \right)$$
$$(\text{if } B = \mathrm{MAX}(R, G, B))$$

where R, G, and B represent a red component, a green component, and a blue component of a pixel before conversion, respectively; MAX and MIN represent the maximum value and the minimum value among the red component, the green component, and the blue component of a pixel before conversion, respectively; and H, V, and S represent hue, value or lightness, and saturation after conversion, respectively. However, regarding the value of H, if a value obtained by expressions (1) is negative, a value obtained by adding 360 to the obtained value is the value of hue. In this example, the value or lightness V and the saturation S have their respective values within the range of 0 to 255. The hue H has a value of 0 to 359.

The finger region detection unit 11 extracts pixels that satisfy the condition of the following expressions, as pixels having a flesh color, from an image in which each pixel has a value in the HSV color system.

$$0.11 < 2\pi \frac{H}{360} < 0.22 \qquad (2)$$
$$0.2 < \frac{S}{255} < 0.5$$

The finger region detection unit 11 performs labelling on the extracted pixels having a flesh color (hereinafter, referred to as flesh-color pixels for the sake of convenience), coupling together flesh-color pixels. The finger region detection unit 11 thus determines a region of the fresh-color pixels coupled together to be a finger region. Additionally, the finger region detection unit 11 may determine a region obtained by performing morphological dilation and erosion operations on the region of the flesh-color pixels coupled together to be a finger region. In cases where there are a plurality of regions of the flesh-color pixels coupled together, the finger region detection unit 11 may determine a region with the longest outline, among the plurality of regions, to be a finger region. Note that the finger region detection unit 11 may detect a finger region according to any of various methods of detecting a finger region from an image, for example, a method disclosed in Japanese Laid-open Patent Publication No. 2003-346162.

Once a finger region is detected, the finger region detection unit 11 detects the tip of the finger region as the position of a fingertip on the image. For example, when it is assumed that the base of a finger is located on the upper side of an image and the fingertip is located on the lower side of the image, the finger region detection unit 11 determines the position of a pixel with the lowest coordinate in the vertical direction, among pixels located on the contour of the finger region, as a fingertip position. Alternatively, the finger region detection unit 11 may detect a fingertip position on an image according to any of various methods of detecting a fingertip position on an image.

The finger region detection unit 11 notifies the fingertip position calculation unit 12 of the finger region and the finger position on the image.

Each time the finger position calculation unit 12 is notified of a finger region and a fingertip position from the finger region detection unit 11, the finger position calculation unit 12 calculates the fingertip position in real space from the fingertip position on the image and the corresponding point on the other image. Note that, in the present embodiment, among images obtained by using the camera 4-2, an image with a captured time closest to the capture time of the image in which the finger position is detected is determined as the other image.

For this purpose, the fingertip position calculation unit 12 sets a template used for matching with the other image captured by the camera 4-2, for the image captured by the camera 4-1 in which the finger region and the fingertip position are detected. It is preferable that the template be set, for example, in such a manner as to include part on the tip side of the finger region including the fingertip position.

Note that the fingertip position calculation unit 12 may overwrite the value of each pixel other than the finger region within the template with a given value (for example, zero) in order to reduce the effects on template matching caused by the values of pixels other than the finger region within the template.

The finger position calculation unit 12 performs template matching between the template and the other image. At that point, the finger position calculation unit 12 calculates a normalized cross correlation value between the template and the other image, for example, while shifting the relative position of the template with respect to the other image in the horizontal direction (that is, the parallax direction between the camera 4-1 and the camera 4-2). Note that the fingertip calculation unit 12 may also shift the relative position of the template with respect to the other image in the vertical direction. The fingertip position calculation unit 12 then obtains the position of the template on the other image when the normalized cross correlation has a maximum value. The fingertip calculation unit 12 determines a point on the other image corresponding to the fingertip position within the template when that template is aligned with the position on the other image so that the normalized cross correlation has a maximum value, as the corresponding point of the fingertip position.

In the present embodiment, the installation position, the angle of view, and the resolution of each camera are known, and thus the fingertip position calculation unit 12 may determine the position in real space of the finger from the position of a fingertip on one image and the position of the corresponding point on the other image, based on triangulation. For example, the fingertip position calculation unit 12 calculates the three-dimensional coordinates (XC, YC, ZC) of the position of a fingertip in the camera coordinate system, with the origin at the front principal point of the imaging optical system of the camera 4-1, according to the following expressions. Note, however, that, in the camera coordinate system, the direction from the front principal point of the imaging optical system of the camera 4-1 to the front principal point of the imaging optical system of the camera 4-2 is defined as the X-axis direction, and the direction parallel to the optical axis of the imaging optical system of the camera 4-1 is defined as the Z-axis direction. The direction that is at right angles to the X-axis direction and the Z-axis direction is the Y-axis direction.

$$X_C = \frac{\left(xc1 - \frac{W}{2}\right) \cdot D}{(xc1 - xc2)} \quad (3)$$

$$Y_c = \frac{\left(yc1 - \frac{H}{2}\right) \cdot D}{(xc1 - xc2)}$$

$$Z_C = \frac{f \cdot D}{xc1 - xc2}$$

$$f = \frac{\sqrt{W^2 + H^2}}{2\tan\frac{\theta}{2}}$$

Here, (xc1, yc1) is the coordinates of a fingertip on an image captured by the camera 4-1, and (xc2, yc2) are the coordinates of the corresponding point on an image captured by the camera 4-2. D is the distance between the front principal point of the imaging optical system of the camera 4-1 and the front principal point of the imaging optical system of the camera 4-2, that is, a base length (mm). W is the number of pixels in the horizontal direction of each image, H is the number of pixels in the vertical direction of each image, and θ is the viewing angle in the diagonal direction of each of the cameras 4-1 and 4-2.

In order to facilitate determining whether or not a fingertip touches the object 8 mounted on a table, it is preferable that the finger position calculation unit 12 convert the coordinates in real space of the fingertip position in the camera coordinate system into the coordinates in the global coordinate system with the origin at an arbitrary point on the table.

Figure 5:
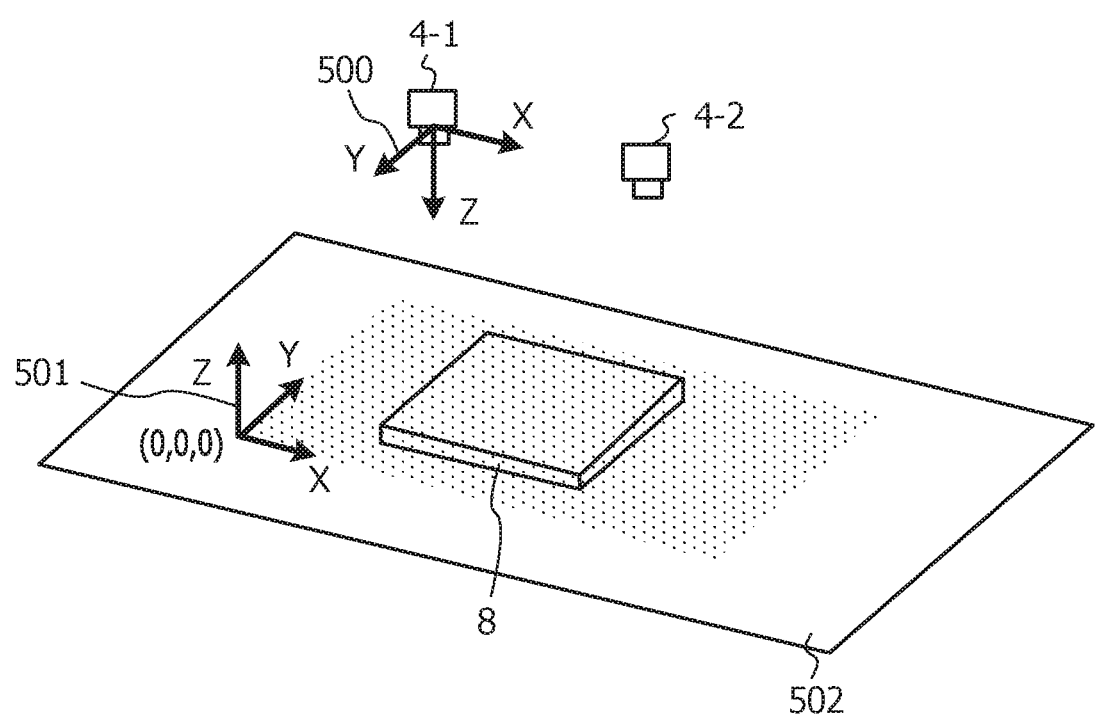
FIG. 5 is a diagram illustrating an example of a positional relationship between a camera coordinate system and a global coordinate system.

FIG. 5 is a diagram illustrating an example of the positional relationship between the camera coordinate system and the global coordinate system. In a camera coordinate system 500, as described above, the front principal point of the imaging optical system of the camera 4-1 is set as the origin. The direction from the front principal point of the imaging optical system of the camera 4-1 to the front principal point of the imaging optical system of the camera 4-2 is the X-axis direction, the direction parallel to the optical axis of the imaging optical system of the camera 4-1 is the Z-axis direction, and the direction that is at right angles to the X-axis direction and the Z-axis direction is the Y-axis direction.

On the other hand, in a global coordinate system 501, the origin is set on a table 502 on which the object 8 is mounted. In this example, one of corners of an area where a video from the projector device 2 is projected is determined as the origin. On a plane parallel to the surface of the table 502, the X-axis direction of the global coordinate system 501 is set so as to be parallel to a line connecting the front principal point of the imaging optical system of the camera 4-1 and the front principal point of the imaging optical system of the camera 4-2. On the plane parallel to the surface of the table 502, the Y-axis direction is set in a direction that is at right angles to the X-axis direction. The direction of the normal of the surface of the table 502 is the Z-axis direction of the global coordinate system 501.

The fingertip position calculation unit 12 converts the coordinates $P=(X_c, Y_c, Z_c)$ of the position of a fingertip in the camera coordinate system into coordinates $P'=(X_f, Y_f, Z_f)$ in the global coordinate system according to the following expressions.

$$P' = RP + T \quad (4)$$

$$P' = \begin{pmatrix} X_f \\ Y_f \\ Z_f \end{pmatrix}, P = \begin{pmatrix} X_C \\ Y_C \\ Z_C \end{pmatrix}$$

where R is a rotation matrix representing the amount of rotation between the camera coordinate system and the world coordinate system, and T is a translation vector representing a translation amount between the origin of the camera coordinate system and the origin of the global coordinate system. When the camera coordinate system and the global coordinate system are arranged as illustrated in FIG. 5, the relationship between the camera coordinate system and the global coordinate system is such that the systems rotate with respect to each other by an angle θ about the axis of rotation, which is the X-axis of the camera coordinate system. The rotation matrix R is thus expressed by the following expression.

$$R = \begin{pmatrix} 1 & 0 & 0 \\ 0 & \cos\theta & -\sin\theta \\ 0 & \sin\theta & \cos\theta \end{pmatrix} \quad (5)$$

In particular, when the camera 4-1 is installed so that the optical axis of the imaging optical system of the camera 4-1 is parallel to the normal line of the table on which the object 8 is mounted, $\theta=180°$.

When the differences in all the axes between the origin of the camera coordinate system and the origin of the global coordinate system are $D_a$, $D_b$, and $D_c$, respectively, the translation vector T is expressed by the following expression.

$$T = \begin{pmatrix} D_a \\ D_b \\ D_c \end{pmatrix} \quad (6)$$

Note that the rotation matrix R and the translation vector T are determined in advance, based on the installation positions of the camera 4-1 and the camera 4-2 and the projection range of the projector device 2, and are stored in the storage unit 6.

From expressions (4) to expression (6), the coordinates of the position of a fingertip in the global coordinate system, $P'={}^t(X_f, Y_f, Z_f)$, is calculated according to the following expressions.

$$X_f = X_C + D_a$$

$$Y_f = \cos\theta \cdot Y_C - \sin\theta \cdot Z_C + D_b$$

$$Z_f = \sin\theta \cdot Y_C + \cos\theta \cdot Z_C + D_c \quad (7)$$

The fingertip position calculation unit 12 stores the calculated coordinates P' of the fingertip position in the global coordinate system, in association with the capture time for an image used for the calculation of the coordinates P', in the storage unit 6. For example, when the image capture periods of the camera 4-1 and the camera 4-2 are 1/60 second, up to 120 sets of coordinates P' of fingertip positions during the last 2 seconds are stored in the storage unit 6.

The touch determination unit 13 determines whether or not a fingertip of the user has touched the object 8, in order to detect an input operation of the user. If the fingertip of the user has touched the object 8, the touch determination unit 13 determines that an input operation in accordance with the touch position has been performed.

The touch determination unit 13 reads a height $Z_t$ of the object 8, which corresponds to the coordinates $(X_f, Y_f)$ in the X direction and in the Y direction of the fingertip position P', from the height map in the storage unit 6. The height $Z_t$ is also represented in the global coordinate system. If the $Z_f$, which is the coordinate in the Z direction of the fingertip position P', and the height $Z_t$ of the object 8 satisfy the condition given below, that is, if the difference between $Z_f$ and $Z_t$ is within a given permissible range, the touch determination unit 13 determines that the fingertip has touched the object 8. On the other hand, if the condition given below is not satisfied, the contact determination unit 13 determines that the fingertip has not touched the object 8.

$$Z_f \leq Z_t + FH + Mz \quad (8)$$

where FH is, for example, a value corresponding to the thickness of a finger in a fingertip portion and is set to, for example, 10 mm; and Mz is a margin in consideration of a difference in the thickness of a finger among persons or a difference in the height of a finger depending on the way in which a finger touches the object 8 and is set to, for example, 5 mm. As Mz increases, it becomes more likely that a fingertip will be determined to have touched the object 8, even though the fingertip has not touched the object 8.

Note that, based on the fingertip position P' detected from an image captured by each camera during the last given period of time, the touch determination unit 13 may determine whether or not the fingertip has touched the object 8. For example, the touch determination unit 13 may calculate an average value $(X_{fave}, Y_{fave}, Z_{fave})$ of the fingertip position P' during the last given period of time (for example, corresponding to five frames). If the value $Z_{fave}$ of the Z coordinate of the average value is less than or equal to $(Z_t+FH+Mz)$, the touch determination unit 13 may determine that the fingertip has touched the object 8.

If the touch determination unit 13 determines that the fingertip has touched the object 8, the touch determination unit 13 notifies the input processing unit 16 of the fingertip position P'. On the other hand, if the touch determination unit 13 determines that the fingertip has not touched the object 8, the touch determination unit 13 notifies the touch action determination unit 14 of that determination.

If the touch determination unit 13 determines that the fingertip has not touched the object 8, the touch action determination unit 14 calculates a feature value representing a motion of the finger based on the respective fingertip positions calculated during the last given period of time. The touch action determination unit 14 determines whether or not the feature value satisfies a condition corresponding to a touch action in which the user is going to touch a fingertip to the object 8. If the feature value satisfies this condition, the touch action determination unit 14 determines that the fingertip of the user has touched the object 8.

Here, the following two actions are generally assumed to be touch actions that the user is able to perform when, even though the user touches their fingertip to the object 8, the input device 1 does not provide any reaction: (1) to cause a finger to remain stationary while keeping the finger in touch with the object, and (2) to repeat an action of touching the same place of the object with a fingertip. That is, using the same place of the object as the bottom, the finger is repeatedly moved up and down.

Figure 6A:
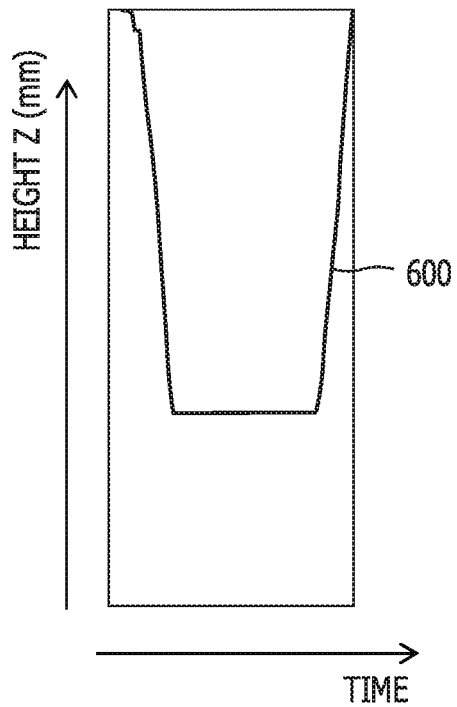
FIG. 6A and FIG. 6B are diagrams each depicting an example of a measurement result of the variation with time of the height of a finger from a table when the user is performing an action of touching the fingertip to an object.
Figure 6B:
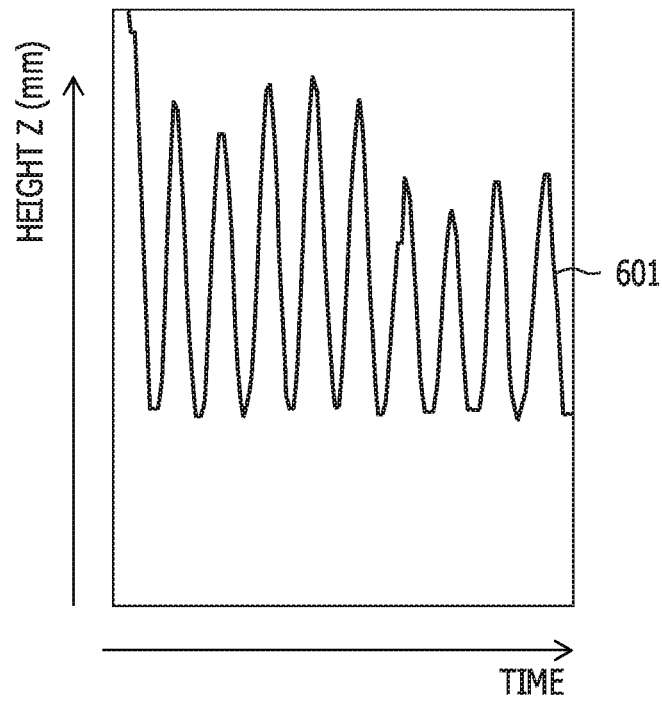

FIG. 6A is a diagram depicting an example of a measurement result of the variation with time of the height of the finger from the table when the user is performing the above action (1). FIG. 6B is a diagram depicting an example of a measurement result of the variation with time of the height of the finger from the table when the user is performing the above action (2). In FIG. 6A and FIG. 6B, the horizontal axis represents time and the vertical axis represents the height from the table. A graph 600 represents the relationship between the passage of time and the height of the fingertip when the user performs the above action (1). A graph 601 represents the relationship between the passage of time and the height of the fingertip when the user performs the above action (2).

It is assumed that the user performs either of the above actions (1) and (2). In this case, as depicted in the graph 600 and the graph 601, the bottom of the fingertip position during the action, that is, the local minimum of the distance between the fingertip and the table during the action (in other word, the local maximum of the distance from the camera 4-1 to the fingertip) is substantially fixed during the action. This is because the finger of the user comes into touch with the object 8 at the bottom position and the finger is not able to be moved any farther toward the table.

In contrast, FIG. 7A is a diagram depicting an example of a measurement result of the variation with time of the height of the finger from the table when the user moves the finger down and causes the finger to be stationary before the finger comes into touch with some substance. In FIG. 7A, the horizontal axis represents time and the vertical axis represents the height from the table. A graph 700 represents the relationship between the passage of time and the height of the fingertip when the user performs the action mentioned above. FIG. 7B is a diagram depicting an example of a measurement result of the variation with time of the height of the finger from the table when the user repeats an action of moving the finger down and causing the finger to be stationary before the finger comes into touch with some substance. In FIG. 7B, the horizontal axis represents time and the vertical axis represents the height from the table. A graph 701 represents the relationship between the passage of time and the height of the fingertip when the user repeats the action.

When the user causes the finger to be stationary in the air, the position of the fingertip at the bottom varies during that action as depicted in the graph 700 and the graph 701. This is because there is no substance in touch with the finger at the position of the bottom and therefore it is difficult for the user to cause the finger to remain stationary at the same position.

Thus, from respective ones of the fingertip positions in real space determined during the last given period of time (for example, 2 seconds), the touch action determination unit 14 calculates a feature value representing a motion of a finger used for determining whether or not the above action (1) or (2) is performed.

For example, the touch action determination unit 14 calculates an indicator indicating the degree of variation of the fingertip position in real space in the given period of time, as a feature value for determining whether or not the above action (1) is performed. As such an indicator, for example, the touch operation determination unit 14 calculates a difference between the maximum value and the minimum value of a fingertip position $(X_f, Y_f, Z_f)$ for each axis of the global coordinate system, that is, calculates $XD=|X_{fmax}-X_{fmin}|$, $YD=|Y_{fmax}-Y_{fmin}|$, and $ZD=|Z_{fmax}-Z_{fmin}|$. Note that $X_{fmax}$, $Y_{fmax}$, and $Z_{fmax}$ may be coordinate values of the finger position obtained at different times. Similarly, $X_{fmin}$, $Y_{fmin}$, and $Z_{fmin}$ may be coordinate values of the finger position obtained at different times.

In this case, if the feature value (XD, YD, ZD) satisfies a condition given below, the touch action determination unit 14 determines that the user has performed the above action (1).

$$XD=|X_{fmax}-X_{fmin}|\leq Mxdiff$$

$$YD=|Y_{fmax}-Y_{fmin}|\leq Mydiff$$

$$ZD=|Z_{fmax}-Z_{fmin}|\leq Mzdiff \quad (9)$$

where Mxdiff, Mydiff, and Mzdiff are maximum values of a movement amount of the fingertip position with which the position of the fingertip is assumed to be stationary, and they are set, for example, such that Mxdiff=Mydiff=Mzdiff=2 mm.

The touch action determination unit 14 calculates, as a feature value for determining whether or not the above action (2) is performed, the number of times NumZmin that a difference ZD of a height $Z_f$ of the fingertip position obtained during the given period of time from its minimum value $Z_{fmin}$ falls below or equals Mzdiff. Note that the minimum value $Z_{fmin}$ of the height of the fingertip position corresponds to the maximum value of a distance from the camera 4-1 to the fingertip position. In this case, when the condition that the number of times NumZmin be greater than or equal to a given number of times ThNum is satisfied, the touch action determination unit 14 determines that the user has performed the above action (2). Note that the given number of times ThNum is set to, for example, a value obtained by multiplying the number of measurements of the fingertip position during the given period of time by 0.5 to 0.7. For example, as described above, when the given period of time is 2 seconds and the image capture periods of the camera 4-1 and the camera 4-2 are 60 frame/sec, the fingertip position is measured 120 times during the given period of time. In this case, the given number of times ThNum is set to, for example, 80 times. Further, the touch action determination unit 14 may set a condition that the number of times that $ZD=(Z_f-Z_{fmin})$ exceeds Mzdiff be greater than or equal to a given number of times ThNum2, in addition to the condition that NumZmin be greater than or equal to the given number of times ThNum, as conditions for determining whether or not the user has performed the above action (2). In this case, ThNum2 is set to, for example, a value with which (ThNum+ThNum2) is less than or equal to the number of measurements of the fingertip position during the given period of time and that is obtained by multiplying the number of measurements by 0.2 to 0.4.

Note that the feature value used for determining whether or not a touch action has been performed is not limited to the above examples. For example, the touch action determination unit 14 may calculate, as a feature value, another indicator indicating the degree of variation in the fingertip position used for a determination of the above action (1), for example, a standard deviation or a dispersion of the fingertip position of each axis of the global coordinate system during the given period of time. Then, if respective standard deviations or dispersions of the fingertip position on the axes are all less than or equal to given thresholds, the touch action determination unit 14 may determine that the above action (1) is performed. Further, when an indicator indicating the degree of variation in the fingertip position is calculated as a feature value, the touch action determination unit 14 may determine a difference between the maximum value and the minimum value, a standard deviation, or a dispersion of the coordinate only for the height direction.

When the user performs the above action (2), it is assumed that the user repeatedly touches the same position of the object 8 with the fingertip. It is therefore assumed that, during the action (2) being performed, each time the fingertip position reaches the bottom, the fingertip position on a plane (that is, the horizontal plane) parallel to the surface of the table is substantially the same. The touch action determination unit 14 may calculate an indicator indicating the degree of variation of the fingertip position when the height of the fingertip position has a local minimum during the given period of time, as a feature value for a determination of the above action (2). That indicator may be, for example, the absolute value (XD, YD) of a difference between the maximum value and the minimum value, a dispersion, or a standard deviation of each axis of coordinates $(X_f, Y_f)$ of a plane parallel to the table surface of the fingertip position when the height of the fingertip position has a local minimum. Then, if the respective feature values of the axes are all less than or equal to given thresholds, the touch action determination unit 14 may determine that the above action (2) is performed.

Note that the touch action determination unit 14 may calculate a feature value corresponding to either of the above action (1) and action (2) and determine whether or not that feature value satisfies a condition corresponding to a touch action.

If it is determined that the user has performed a touch action to the object 8 during the given period of time, the touch action determination unit 14 regards a fingertip position at which the height of the fingertip position is minimized during the given period of time, as the fingertip position P', and notifies the update unit 15 and the input processing unit 16 of the fingertip position P'.

The update unit 15, which is an example of a registration unit, updates the height map if it is determined by the touch action determination unit 14 that the user has performed a touch action. This is at least because, with the fingertip position P' regarded when it is determined that the user has performed a touch action, the height of the object 8 registered in the height map is not accurate.

For example, the update unit 15 updates the height $Z_t$ of the object 8 registered in the height map by the following expression. This object 8 corresponds to coordinates $(X_f, Y_f)$ in the X direction and the Y direction, which are the coordinates on a plane parallel to the surface of the table among the coordinates $(X_f, Y_f, Z_f)$ of the notified fingertip position P'.

$$Z_{tnew} = Z_f - FH \tag{10}$$

where $Z_{tnew}$ is the height of the object 8 after update, and FH is an assumed value of the thickness of the finger, as is the case with FH in expression (8).

Note that the update unit 15 may update the height of the object 8 to $Z_{tnew}$ for all the positions registered in the height map, not only for the coordinates $(X_f, Y_f)$. Alternatively, when the range where there is a possibility that the object 8 is mounted is known in advance, the update unit 15 may update the height of the object 8 to $Z_{tnew}$ for each position included in that range.

When the height $Z_f$ of the fingertip at the notified fingertip position P' is lower than the height $Z_t$ of the object 8 registered in the height map at the position $(X_f, Y_f)$, that is, when the following expression is satisfied, there is a high possibility that the object once registered in the height map is removed.)

$$Z_f < Z_t \tag{11}$$

Thus, in this case, the update unit 15 may update the height $Z_{tnew}$ of the object 8 at that position $(X_f, Y_f)$ to the same height as the table surface, that is, to zero. Alternatively, when expression (11) is satisfied, the update unit 15 may set the height $Z_{tnew}$ of the object 8 to zero for all the positions registered in the height map or each position included in the range where there is a possibility that the object 8 is mounted.

Note that when expression (11) is satisfied, the update unit 15 may notify the input processing unit 16 that a determination result saying that the fingertip has touched the object 8, which is provided by the touch action determination unit 14, will be cancelled.

The input processing unit 16 performs input processing in accordance with the position P' at which the fingertip of the user has touched the object 8, for example, in accordance with an application program that is running in the control unit 7. For example, the input processing unit 16 causes the projector device 2 to project a video including a circle in a given color and with a given size centered around the position P'.

In this case, the input processing unit 16 identifies the position on the display screen of the projector device 2 corresponding to the position P' in the global coordinate system. For this purpose, the input processing unit 16 converts the coordinates of the position P' in the global coordinate system into coordinates $P''={}^t(X_p, Y_p, Z_p)$ in a coordinate system with the origin at the center of the display screen of the projector device 2 (hereinafter referred to as a projector coordinate system for the sake of convenience). Conversion of coordinates from the global coordinate system to the projector coordinate system is calculated by expressions similar to expressions (4). At that point, the rotation matrix R represents the amount of rotation from the global coordinate system to the projector coordinate system, and the translation vector T represents the amount of movement from the origin of the global coordinate system to the origin of the projector coordinate system. Then, the input processing unit 16 converts the coordinates of the position P''' in the projector coordinate system into the corresponding two-dimensional coordinates $(x_p, y_p)$ on the display screen of the projector device 2. For example, the input processing unit 16 calculates the two-dimensional coordinates $(x_p, y_p)$ on the display screen of the projector device 2 according to the following expressions.

$$x_p = fp \cdot \frac{X_p}{Z_p} + \frac{pimageW}{2} \tag{12}$$

$$y_p = fp \cdot \frac{Y_p}{Z_p} + \frac{pimageH}{2}$$

where fp is a focal length of the projection optical system of the projector device 2, pimageW is the number of displayed pixels in the horizontal direction of the projector device 2, and pimageH is the number of displayed pixels in the vertical direction of the projector device 2. Note that, in order to cause the projector device 2 to project a circle with a given radius centered around the position P', the input processing unit 16 determines the coordinates in the global coordinate system of points of four corners of a square touching the circle on the table on which the object 8 is mounted. Then, the input processing unit 16 converts the coordinates of each point into two-dimensional coordinates on the display screen of the projector device 2. Then, the input processing unit 16 may cause a circle inscribed in a square with the four corners at the points to be drawn on the display screen of the projector device 2.

The input processing unit 16 is not limited to the processing described above and may perform various types of input processing in accordance with the position P' at which the fingertip touches the object 8. For example, the input processing unit 16 may start an application in accordance with the position P' or may change a video projected by the projector device 2 in accordance with the position P'. The input processing unit 16 may perform input processing in accordance with temporal changes in the position P'. For example, the input processing unit 16 may scroll or zoom in or out a video projected by the projector device 2 along the direction of movement of the position P'.

Figure 8:
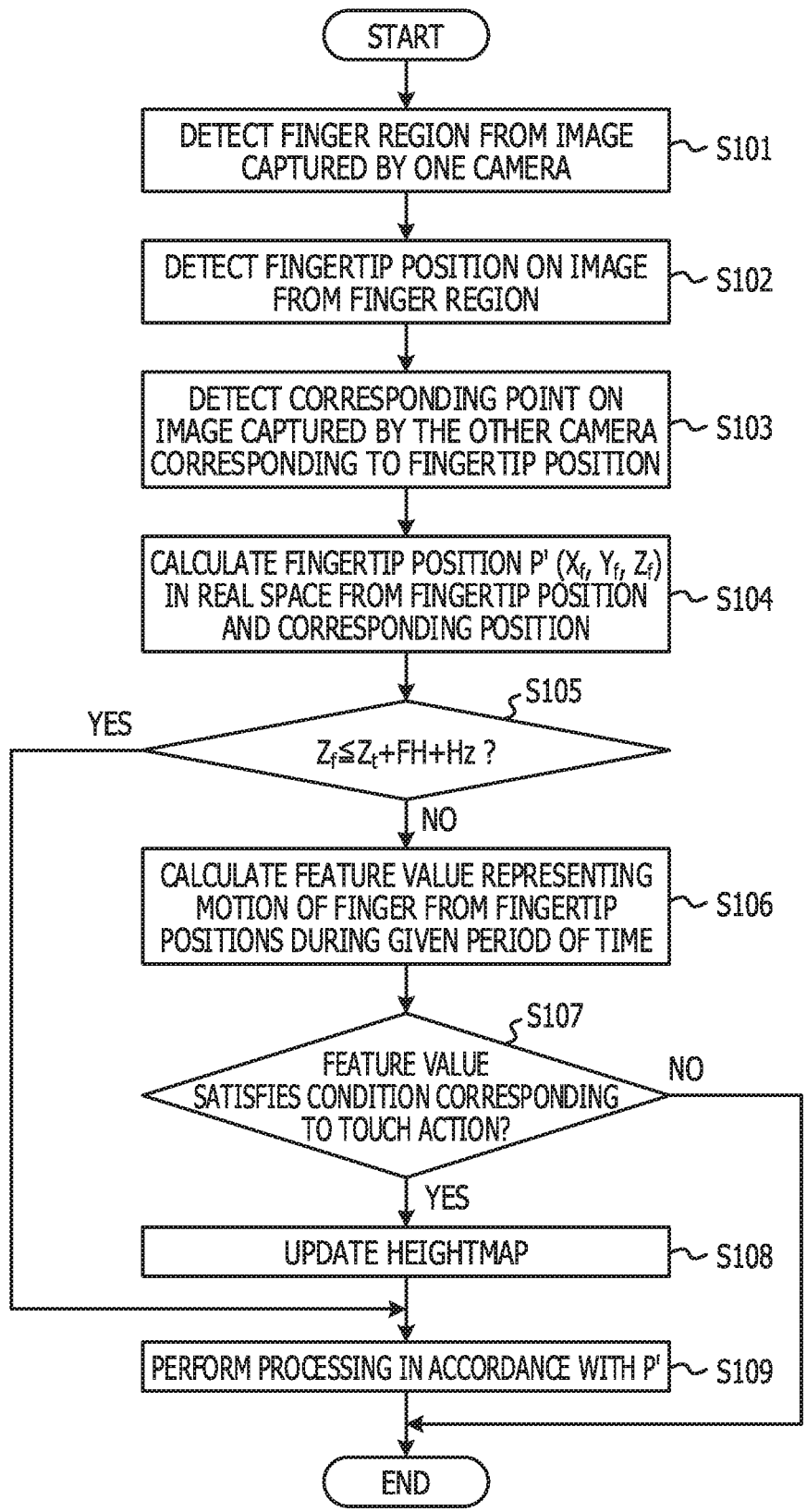
FIG. 8 is an operation flowchart of an input process.

FIG. 8 is an operation flowchart of an input operation detection process executed by the control unit 7.

The finger region detection unit 11 detects a finger region, where a finger is captured, on an image obtained from the camera 4-1 (step S101). The finger region detection unit 11 then detects the tip of the finger region as a fingertip position on the image (step S102).

The fingertip position calculation unit 12 identifies the corresponding point on an image obtained from the camera 4-2 with respect to the fingertip position on the image obtained from the camera 4-1 (step S103). Based on the fingertip position on the image and its corresponding point, the fingertip position calculation unit 12 calculates the fingertip position P' ($X_f$, $Y_f$, $Z_f$) in real space (step S104).

The touch determination unit 13 determines whether or not the height $Z_f$ from the table to the fingertip at the fingertip position P' in real space satisfies the touch determination condition of expression (8) (step S105). If the height $Z_f$ does not satisfy the touch determination condition of expression (8) (S105—No), the touch action determination unit 14 calculates a feature value representing a motion of the finger from respective ones of the fingertip positions in real space obtained during the last given period of time (step S106). Then, the touch action determination unit 14 determines whether or not that feature value satisfies the condition corresponding to performing a touch action (step S107).

If the feature value does not satisfy the condition corresponding to performing a touch action (step S107—No), the touch action determination unit 14 determines that the user has not performed the touch action. Then, the control unit 7 completes the input process.

On the other hand, if the feature value satisfies the condition corresponding to performing the touch action (step S107—Yes), the touch action determination unit 14 determines that the user has performed the touch action. Then, the update unit 15 determines anew the fingertip position corresponding to the minimum value of the height of the fingertip during the given period of time, as P', and updates the height map based on the P' (step S108).

After step S108 or if, in step S105, the height $Z_f$ satisfies the touch determination condition of expression (8) (step S105—Yes), the input processing unit 16 performs processing in accordance with the fingertip position P' (step S109). Then, the control unit 7 completes the input process.

As described above, when the input device is not able to sense that the fingertip has touched the object, by using the height of the fingertip from the table determined using images from the two cameras, the input device calculates a feature value representing a motion of the finger from the position of the fingertip during the given period of time. If the feature value satisfies the condition corresponding to a touch action, the input device determines that the fingertip has touched the object. Therefore, the input device may detect an input operation that the user touches the object with their finger, even when the height of the object from the table is not clear or not accurate.

According to another embodiment, if a feature value representing a motion of a finger satisfies the condition corresponding to a touch action, a control unit may display a button through a projector device for verification. When the user performs an action of touching the button, the control unit may determine that the user has performed an input operation.

Figure 9:
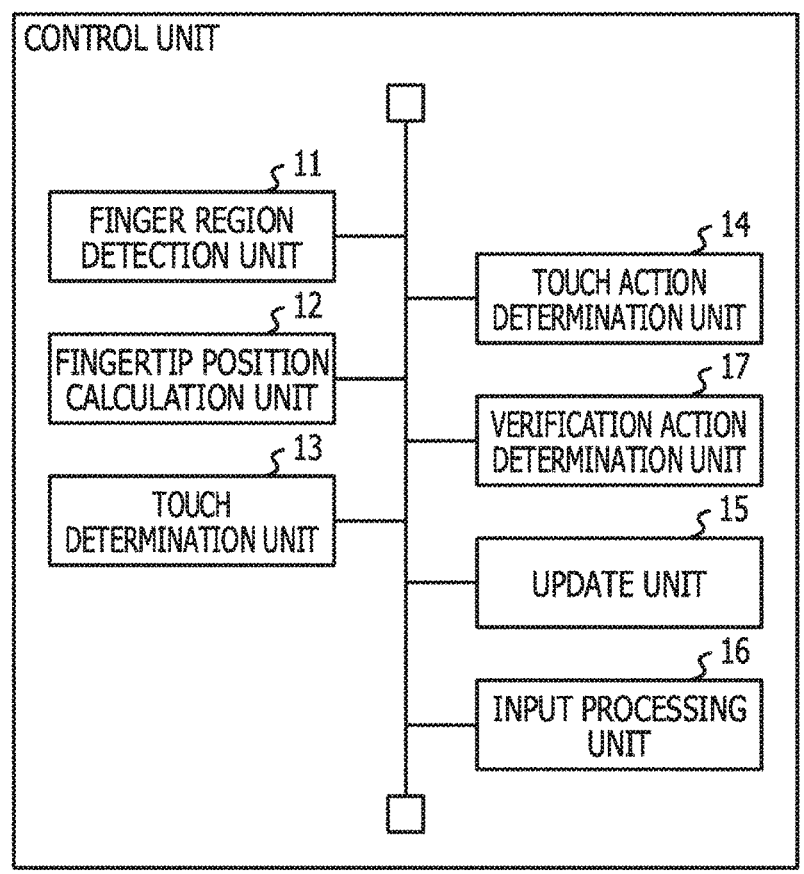
FIG. 9 is a functional block diagram of a control unit according to a second embodiment.

FIG. 9 is a functional block diagram of a control unit according to a second embodiment. A control unit 71 according to the second embodiment includes the finger region detection unit 11, the fingertip position calculation unit 12, the touch determination unit 13, the touch action determination unit 14, the update unit 15, the input processing unit 16, and a verification action determination unit 17.

The control unit 71 according to the second embodiment, as compared to the control unit 7 according to the first embodiment, differs from the control unit 7 in that the control unit 71 includes the verification action determination unit 17. Therefore, hereinafter, the verification action determination unit 17 and its related portions will be described. For other elements of the input device 1, description of the corresponding elements in the above embodiment is to be referred to.

Once the touch action determination unit 14 determines that the user has performed a touch action, the touch action determination unit 14 notifies the verification action determination unit 17 of the fingertip position P' of the user.

If it is determined by the touch action determination unit 14 that the user has performed the touch action, the verification action determination unit 17 causes a button, which is an example of a mark for operation verification, to be projected toward the table surface by the projector device 2.

FIG. 10A and FIG. 10B are diagrams each illustrating an example of a button for operation verification. A button 1000 illustrated in FIG. 10A is projected on the right of the fingertip position P' ($X_f$, $Y_f$, $Z_f$). In this case, for example, the position BC ($X_b$, $Y_b$, $Z_b$) of the center of the button 1000 is set such that $X_b = X_f + 30$ mm, $Y_b = Y_f$, $Z_b = Z_f - FH$, and the radius $R_{cb}$ of the button 1000 is set to, for example, 15 mm.

A button 1001 illustrated in FIG. 10B is projected to be superimposed on the fingertip position P' ($X_f$, $Y_f$, $Z_f$). In this case, for example, the position BC ($X_b$, $Y_b$, $Z_b$) of the center of the button 1001 is set such that $X_b = X_f$, $Y_b = Y_f$, and $Z_b = Z_f - FH$, and the radius $R_{cb}$ of the button 1000 is set to, for example, 15 mm.

Note that the verification action determination unit 17 may determine the position and the range on the display screen of the projector device 2 corresponding to the position and the range of a button for operation verification on the projected surface in a manner similar to the manner in which the input processing unit 16 causes a circle to be projected in the above embodiment.

The shape and size of a button for operation verification are not limited to the examples mentioned above. For example, the button may be a triangle, a quadrilateral, or a hexagon. The size of a button may be smaller than the size of a button in each of the examples mentioned above.

Figure 11A:
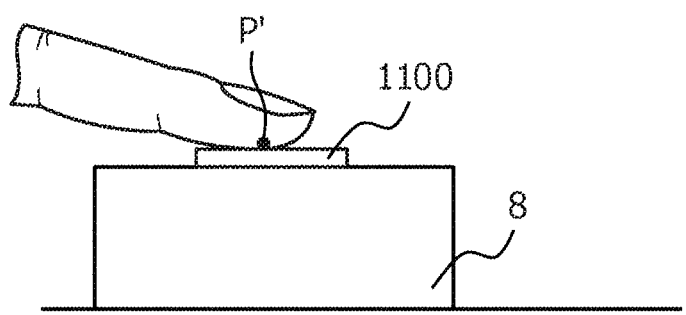
FIG. 11A is a diagram illustrating an example of the relationship between the object and a button when the position of a fingertip is on the surface of the object.
Figure 11B:
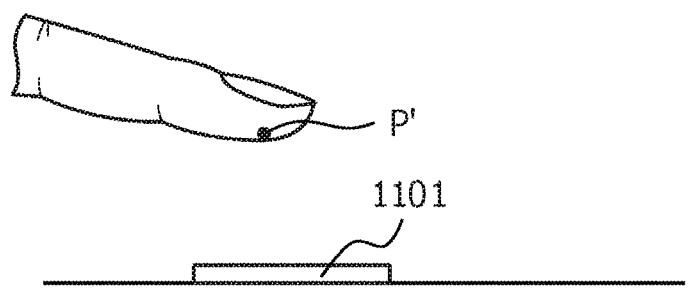
FIG. 11B is a diagram illustrating an example of the relationship between the object and a button when the position of a fingertip is in the air.

FIG. 11A is a diagram illustrating an example of the relationship between the object 8 and a button when the fingertip position P' obtained by the touch action determination unit 14 is located on the surface of the object 8. In contrast, FIG. 11B is a diagram illustrating an example of the relationship between the object 8 and a button when the fingertip position P' obtained by the touch action determination unit 14 is located in the air.

As illustrated in FIG. 11A, when the fingertip touches the object 8, that is, when the fingertip position P' is located on the surface of the object 8, a button 1100 is projected on the surface of the target 8. Therefore, the button 1100 is displayed at a position of an intended height and in an intended size (with a diameter of approximately 30 mm in the above example). In contrast, when, as illustrated in FIG. 11B, an object is not present at the fingertip position P' in reality and a wrong touch action is detected, the button 1101 is displayed at a position lower than the position of the intended height, for example, on the table. Therefore, the button 1101 is larger (a diameter of approximately 37 mm in the above example) than the intended size. Further, when the direction of projection of a button is a direction that is diagonal to a vertical downward direction, the position of the button is displaced in accordance with the direction of projection of the button.

Note that the verification action determination unit 17 may set the position of projection of a button independently of the fingertip position P'. For example, the verification action determination unit 17 may project a button to the center of the range of projection produced by the projector device 2 or a left end or a right end of the projection range. In this case, however, information on the fingertip position taken when the user touches the button is not used for update of the height map.

The verification action determination unit 17 determines whether or not any of fingertip positions $(X_f', Y_f', Z_f')$ within a given period of time (for example, 1 to 2 seconds) from a point in time at which a certain wait time (for example, 1 second) has passed after a button was projected is included within a permissible range in accordance with the position of projection of the button. If it is determined that the fingertip position Pr is included in the permissible range, the verification action determination unit 17 determines that the user has performed an action of touching the button with their finger, that is, a verification action. In this case, the verification action determination unit 17 determines that the user has performed an input operation of touching the object 8 at the fingertip position P' received from the touch action determination unit 14. Then, the verification action determination unit 17 passes the fingertip position P' to the update unit 15 and the input processing unit 16.

Note that the permissible range is expressed by the following expressions.

$$(X_f' - X_b)^2 + (Y_f' - Y_b)^2 \le R_{cb}$$

$$Z_b + FH - Mz \le Z_f' \le Z_b + FH + Mz \quad (13)$$

where Mz is a permissible range in the height direction and is set to, for example, 5 mm. As expressed in expressions (13), the permissible range is determined based on the intended position and size of the button. Therefore, when a wrong touch action is detected and, as a result, the position of projection of a button is displaced from the intended position, expressions (13) are less likely to be satisfied even if the finger of the user is located at the position of the button actually displayed.

If it is determined that the user has performed a verification action, the verification action determination unit 17 causes the projector device 2 to stop projecting a button. That is, the verification action determination unit 17 inhibits a button from being displayed. Alternatively, if it is determined that the user has performed a verification action, the verification action determination unit 17 may cause the projector device 2 to change the color of a button and then stop projecting the button.

On the other hand, if, after the passage of a given period of time, it is not determined that the user has performed a verification action, the verification action determination unit 17 also causes the projector device 2 to stop projecting a button. Alternatively, if, after the passage of a given period of time, it is not determined that the user has performed a verification action, the verification action determination unit 17 may cause the projector device 2 to display a message saying "Do not touch the button" or the like or to change the color of the button. Then, the verification action determination unit 17 may cause the projector device 2 to stop projecting the button at the point in time at which a given period of time has further passed after the message display or after the change of the color of the button.

Additionally, if the verification action determination unit 17 senses that, after the button display, an action in which the user raises their finger once and then touches the button with the finger (that is, a tapping action), the verification action determination unit 17 may determine that the user has performed a verification action. For example, the verification action determination unit 17 compares each of the heights from the table of the fingertip positions obtained in 1 to 2 seconds immediately before the point in time at which the fingertip position Pr satisfies the condition of expressions (13) with a height $Z_f'$ from the table at the fingertip position Pr. Then, if any of the fingertip positions is higher than $Z_f'$ by a given offset (for example, 5 mm to 10 mm) or more, the verification action determination unit 17 may determine that the user has performed an action of raising a finger once and then touching a button with the finger. This enables the verification action determination unit 17 to be inhibited from incorrectly determining that the user has performed a verification action when the user does not intend to touch a button with their finger.

FIG. 12 is an operation flowchart of the input process according to the second embodiment. The input process according to the second embodiment differs, as compared with the input process according to the first embodiment, from this input process in the process after step S106. Thus, hereinafter, the process executed after step S106 will be described.

In step S106, once a feature value representing a motion of a finger is calculated, the touch action determination unit 14 determines whether or not the feature value satisfies the condition corresponding to performing a touch action (step S201).

If the feature value does not satisfy the condition corresponding to performing a touch action (step S201—No), the touch action determination unit 14 determines that the user has not performed the touch action. Then, the control unit 71 completes the input process.

On the other hand, if the feature value satisfies the condition corresponding to performing a touch action (step S201—Yes), the verification action determination unit 17 causes the projector device 2 to project a button toward the table surface (step S202). Then, the verification action determination unit 17 determines whether or not the position Pr in real space of the fingertip obtained in a certain period of time after projection of the button is included in a permissible range in accordance with the position of projection of the button (step S203).

If, even when the certain period of time has passed after projection of the button, the position Pr in real space of the fingertip is not included in the permissible range (step S203—No), the verification action determination unit 17 determines that the user has not performed a verification action. Then, the control unit 71 completes the input process.

On the other hand, if the position Pr in real space of the fingertip is included in the permissible range at any point in time within the certain period of time after projection of the button (step S203—Yes), the verification action determination unit 17 determines that the user has performed a verification action. Then, the update unit 15 determines the fingertip position corresponding to the minimum value of the height of the fingertip during a given period of time in the touch action determination, as P', and, based on the P', updates the height map (step S204). Then, the input processing unit 16 performs processing in accordance with the fingertip position P' (step S205). Then, the control unit 71 completes the input process.

According to the second embodiment, the input device determines that an input operation has been performed, under the condition that a fingertip has touched the button displayed after detection of a touch action. Therefore, even if a wrong touch action is detected, the input device may be inhibited from detecting a wrong input operation that is contrary to the intention of the user.

Note that according to a modification, the update unit 15 may perform the processing of the touch action determination unit 14 and the processing of the verification action determination unit 17 at a plurality of locations (preferably three or more locations) different from each other to obtain the height from the table to the surface of the object 8 at respective ones of the plurality of locations. Then, the update unit 15 may obtain a plane or a curved surface passing through the location points using, for example, a least square method and approximately represent the surface of the object 8 by using the plane or the curved surface.

For example, the update unit 15 may obtain parameters a, b, c, and d defining the plane by applying a least square method to the expression of the plane expressed by the following expression.

$$aX+bY+cZ+d=0 \quad (14)$$

Then, the update unit 15 may obtain the height from the table to the surface of the object 8 at each of positions of the plane parallel to the table in accordance with the plane or curved surface approximately representing the surface of the object 8, and thus update the height map.

Additionally, according to another modification, only when the input device determines that the user has performed a touch action, or when the input device determines that the user has performed a touch action and has performed a verification action, the input device may determine that an input operation has been performed. In this case, since information on the height of the object is not used, the storage unit does not have to store the height map. In addition, among processing performed in the control unit, processing of the touch determination unit and processing of the update unit may be omitted.

All the examples and specific terms recited herein are intended for instructional purposes to aid the reader in understanding the present disclosure and concepts contributed by the inventor to furthering the art, and are to be construed as being without limitation to any of the configurations of examples of the present specification and such specifically recited examples and conditions related to demonstration of the superiority and inferiority of the present disclosure. Although the embodiments of the present disclosure have been described in detail, it is to be understood that various changes, replacements, and modifications may be added to them without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A touch detection apparatus comprising:
a first camera configured to capture each of a plurality of first images in each given period;
a second camera arranged apart from the first camera by a given interval and configured to capture each of a plurality of second images in each given period;
a memory; and
a processor coupled to the memory, and configured to:
detect a plurality of first positions corresponding to a tip of the finger in the plurality of first images;
obtain a plurality of second positions in the plurality of second images corresponding to the detected plurality of first positions;
calculate a plurality of third positions based on the detected plurality of first positions and the detected plurality of second positions, the plurality of third positions being positions in real space of the tip of the finger;
determine whether or not a calculated feature value calculated based on the plurality of third positions satisfies a condition, the condition being a feature value that represents an action of touching an object with the finger; and
determine that an action of touching the object has been performed when the calculated feature value satisfies the condition.

2. The touch detection apparatus according to claim 1, wherein the processor configured to:
when the calculated feature value satisfies the condition, cause a projector device to project a mark onto a given position; and
when at least one of the plurality of third positions is included within a given range determined based on a projected position of the mark after a projection of the mark, determine that the action of touching the object has been performed.

3. The touch detection apparatus according to claim 1, wherein the processor configured to:
calculate, as the calculated feature value, a count of times that a distance from one of the plurality of third position during a given period of time to a farthest position is less than or equal to a given value, the farthest position being a position that is the farthest from the first camera among the plurality of third positions during the given period of time; and
determine that the calculated feature value satisfies the condition when a proportion of the count of times relative to a total count of the plurality of third positions during the given period of time is greater than or equal to a given proportion.

4. The touch detection apparatus according to claim 1, wherein the processor configured to:
calculate, as the calculated feature value, a degree of variation of the plurality of third positions during a given period of time; and
determine that the calculated feature value satisfies the condition when the degree of variation of the plurality of third positions is less than or equal to a given value.

5. The touch detection apparatus according to claim 1, wherein the processor configured to:
calculate, as the calculated feature value, a degree of variation of one or more local maximum positions among the plurality of third positions during the given period of time, a distance from the one or more local maximum position to the first camera having a local maximum; and determine that the calculated feature value satisfies the condition when the degree of variation of the one or more local maximum positions is less than or equal to a given value.

6. The touch detection apparatus according to claim 2, wherein the processor configured to:
set a projected position of the mark in accordance with one of the third positions that is farthest from the first camera during the given period of time.

7. The touch detection apparatus according to claim 2, wherein the processor configured to:
store, in the memory, a height of a furthest position from a reference plane, as a height of the object at the position, when at least one of the plurality of third positions is included within the given range by the given timing after a projection of the mark, the farthest position being a position that is the farthest from the first camera among the plurality of third positions during the given period of time; and
determine that the action of touching the object has been performed when a difference between one of the plurality of third positions from the reference plane and the height of the object at the position stored in the memory is within a given permissible range.

8. A touch detection method executed by a computer, the touch detection method comprising:
acquiring a plurality of first images captured by a first camera;
acquiring a plurality of second images captured by a second camera arranged apart from the first camera by a given interval;
detecting a plurality of first positions corresponding to a tip of the finger in the plurality of first images;
obtaining a plurality of second positions in the plurality of second images corresponding to the detected plurality of first positions;
calculating a plurality of third positions based on the detected plurality of first positions and the detected plurality of second positions, the plurality of third positions being positions in real space of the tip of the finger;
determining whether or not a calculated feature value calculated based on the plurality of third positions satisfies a condition, the condition being a feature value that represents an action of touching an object with the finger; and
determining that an action of touching the object has been performed when the calculated feature value satisfies the condition.

9. A non-transitory computer-readable recording medium storing an touch detection program that causes a computer to execute:
acquiring a plurality of first images captured by a first camera;
acquiring a plurality of second images captured by a second camera arranged apart from the first camera by a given interval;
detecting a plurality of first positions corresponding to a tip of the finger in the plurality of first images;
obtaining a plurality of second positions in the plurality of second images corresponding to the detected plurality of first positions;
calculating a plurality of third positions based on the detected plurality of first positions and the detected plurality of second positions, the plurality of third positions being positions in real space of the tip of the finger;
determining whether or not a calculated feature value calculated based on the plurality of third positions satisfies a condition, the condition being a feature value that represents an action of touching an object with the finger; and
determining that an action of touching the object has been performed when the calculated feature value satisfies the condition.

\* \* \* \* \*